US009511323B2

(12) United States Patent
Lugosch

(10) Patent No.: US 9,511,323 B2
(45) Date of Patent: Dec. 6, 2016

(54) DEHYDRATION OF GASES WITH LIQUID DESICCANT

(71) Applicant: AZOTA GAS PROCESSING, LTD., Houston, TX (US)

(72) Inventor: Pierre E. Lugosch, Houston, TX (US)

(73) Assignee: AZOTA GAS PROCESSING, LTD., Houston, TX (US)

( * ) Notice: Subject to any disclaimer, the term of this patent is extended or adjusted under 35 U.S.C. 154(b) by 183 days.

(21) Appl. No.: 14/257,307

(22) Filed: Apr. 21, 2014

(65) Prior Publication Data

US 2015/0298052 A1 Oct. 22, 2015

(51) Int. Cl.
*B01D 53/26* (2006.01)
*B01D 53/14* (2006.01)

(52) U.S. Cl.
CPC ......... *B01D 53/263* (2013.01); *B01D 53/1406* (2013.01); *B01D 53/1425* (2013.01)

(58) Field of Classification Search
CPC ............... B01D 2252/504; B01D 53/1406; B01D 53/1425; B01D 53/263; B01D 53/1493; B01D 53/26; B01D 53/28
See application file for complete search history.

(56) References Cited

U.S. PATENT DOCUMENTS

| 3,105,748 | A | 10/1963 | Stahl | |
|---|---|---|---|---|
| 5,536,303 | A | 7/1996 | Ebeling | |
| 5,643,421 | A | 7/1997 | Smith | |
| 6,299,671 | B1 | 10/2001 | Christensen | |
| 2004/0115109 | A1* | 6/2004 | Minkkinen | ........ B01D 53/1425 423/228 |
| 2014/0174903 | A1* | 6/2014 | Edwards | ............ B01D 19/0005 203/18 |

OTHER PUBLICATIONS

Definition of boiling, dictionary.com, accessed Apr. 18, 2016.*
Enhanced Glycol Concentration Processes, Gas Processors Suppliers Association Engineering Data Book, vol. II, Sections 16-26, Eleventh Edition—FPS 1998.
Weinert, E., "Improvements Stabilize Drizo Glycol-enhancement Process," Oil & Gas Journal, Oct. 28, 2002.

* cited by examiner

*Primary Examiner* — Duane Smith
*Assistant Examiner* — Cabrena Holecek
(74) *Attorney, Agent, or Firm* — Mossman, Kumar & Tyler PC

(57) ABSTRACT

A method for drying natural gas or other industrial gases is disclosed in which such gas streams are dehydrated to very low water dew points using a dry liquid desiccant. The method comprises a continuous process with the liquid desiccant regenerated to by heating and the use of a stripping agent to provide two levels of regeneration which are used in sequential contacting of the gas stream. This disclosure reduces energy and capital costs relative to existing methods.

9 Claims, 3 Drawing Sheets

DEHYDRATION OF GASES WITH LIQUID DESICCANT

CROSS REFERENCE TO RELATED APPLICATIONS

None.

TECHNICAL FIELD

This disclosure relates to the removal of water from a water-wet gas stream using a liquid desiccant. Specifically, the present disclosure relates to the removal of water from the liquid desiccant such that the liquid desiccant may be reused.

BACKGROUND

Natural gas, refinery gas, carbon dioxide, hydrogen, synthesis gas, gas from an oil production facility and other industrial gases are often used in circumstances that require the water in these gases to be removed. Water may be removed, for example, to prevent the formation of hydrates in downstream processes and pipelines, meet dew point specifications for the sale of the gas, and to prevent corrosion associated with wet gas.

There are two general categories of gas dehydration systems: solid desiccant and liquid desiccant. Liquid desiccant systems are relatively simple to operate and easy to maintain. Unfortunately, the liquid desiccant systems are typically unable to produce gases with extremely low levels of moisture. Solid desiccant systems are often used to provide gas with very low levels of moisture. However, these plants can be more complex and expensive to operate than liquid desiccant systems. Thus, there is a continuing need for a relatively simple liquid desiccant gas dehydration system that produces gas with the low moisture content normally associated with solid desiccant systems.

Hygroscopic liquids such as triethylene glycol, diethylene glycol and tetraethylene glycol are commonly used liquid desiccants. In the typical liquid desiccant system, a substantially dry glycol such as one of those listed above is introduced to the top of a contactor. The liquid desiccant flows downward through the contactor while at the same time wet gas is introduced at the bottom of the contactor. When the liquid desiccant and gas contact each other, the liquid desiccant absorbs water from the gas. Water-rich liquid desiccant is removed from the bottom of the contactor, while dry gas leaves the top of the contactor. Water absorbed by the liquid desiccant is removed by the application of heat and the liquid desiccant is thus regenerated and reused. The dryness of the gas, expressed as its "dew point," depends on several factors, including the water content of the dry liquid desiccant, the number of theoretical stages in the contactor, and the liquid desiccant and gas flow rates. The dew point of the dry gas leaving the contactor decreases as the water content of the dry liquid desiccant entering the contactor decreases. To produce a dry gas with a very low dew point, it is essential that the dry liquid desiccant entering the contactor have extremely low moisture content.

The regeneration of wet liquid desiccant is typically accomplished by heating it in order to vaporize the water it has absorbed from the wet gas. The concentration of water in a regenerated liquid desiccant depends in part on the regeneration temperature and pressure. Theoretically, it is possible to produce liquid desiccant with very low levels of water by subjecting the liquid desiccant to high temperatures. However, as the regeneration temperature approaches the boiling point of pure liquid desiccant, the liquid desiccant thermally decomposes. To avoid this problem, thermal regeneration of liquid desiccants is usually limited to temperatures below the thermal decomposition point of the liquid desiccant. This results in a relatively high concentration of water in the regenerated liquid desiccant. The higher concentration of water in the liquid desiccant produces dry gas with a higher than desirable dew point. To date, attempts to deal with the problem of producing low dew point gas with a liquid desiccant system have met with limited success.

A number of processes have been developed which seek to achieve the very low dew point levels achievable with solid desiccant systems which use silica gel, alumina or molecular sieves using liquid desiccants such as tri-ethylene glycol or di-ethylene glycol. These are generally referred to as "Enhanced Liquid Dehydration Systems". The promise of such processes is that the lower energy and capital costs normally associated with liquid desiccant systems could be used advantageously in lieu of solid desiccant systems, for example, in cryogenic natural gas processing plants. Despite approximately thirty years since liquid desiccants have made the claim of being able to replace solid desiccant systems in these applications, such a revolution has never taken place. The enhanced liquid desiccant designs, while able theoretically to achieve water dew point levels experienced with the competing solid desiccant systems, are able to do so only with additional complexity and system sizing which detract from the advantages of these designs. Conventional enhanced liquid desiccant systems employ the principle of introducing an inert "stripping gas" into the regeneration system in order to lower the partial pressure of the water in the hot liquid desiccant. Generally, there have been two methods of providing stripping gas, each with its own advantages.

The original and most general method of reducing the water content of the desiccant was to take a small portion of the dried product gas and introduce it into the desiccant regenerator in counter-current flow into the bottom of a stripping tower which was used to dry the hot partially dried liquid leaving the heater/reboiler. Such a process is described in U.S. Pat. No. 3,105,748. This patent first described the supplementary stripping tower, referred to as a "super dryer". This tower has remained a constant feature of almost all enhanced regeneration systems that followed. In U.S. Pat. No. 6,299,671, a very similar design is proposed which sources its stripping gas by recycling it from the regenerator overhead system. These systems suffer from the fact that the stripping gas must be recovered and returned to the operation since the gas will contain pollutants and have too much value to simply vent to the atmosphere.

One significant improvement in the design of enhanced liquid desiccant systems consisted of using a stripping gas which used vaporized liquid hydrocarbons produced as a side stream of the regeneration process. This design and its many improvements were commercialized under the name of "Drizo" and have a substantial operating record in the industry. These inventions are well described in U.S. Pat. Nos. 3,349,544 and 4,005,997. In these systems the "stripping gas" consists of the liquid hydrocarbons recovered by cooling, condensing and separating the water/hydrocarbon mixture exiting the top of the regenerator. Since these hydrocarbons are liquid at ambient conditions they do not need to be compressed as a gas to be returned to the plant. The liquids are vaporized, super heated and fed in a counter-current flow to the drying tower in a manner identical to the simpler stripping gas systems described in U.S. Pat. Nos. 3,105,748 and 6,299,671. The disadvantage of these vaporized liquid hydrocarbon systems stems from the fact that the liquids, which are used to strip the desiccant, are also water saturated since they are produced as the condensation product of the water effluent of the regeneration system. Accordingly, the presence of water in the stripping gas itself limits the degree of dehydration that can be achieved.

Finally U.S. Pat. No. 5,643,421 remediates certain limitations of, for example, U.S. Pat. No. 4,005,997, by adding a dry desiccant system to the regenerator. This system serves to dry the liquid hydrocarbon stream used as stripping gas before it is heated and vaporized. While such a system is functional it is so at the expense of a significant amount of additional equipment and operating expense.

SUMMARY

In aspects, the present disclosure provides methods and related systems for reducing a water content of a gas stream. An illustrative method may be performed by using a contactor that has two spatially discrete contacting zones and a regenerator configured to generate desiccant streams having different water content. The contactor may have at least a first contacting zone and a spatially distinct second contacting zone.

For drying the gas stream, the method may include the steps of directing the gas stream through the second contacting zone and then through the first contacting zone; feeding a first desiccant stream into the first contacting zone; feeding a second desiccant stream into the second contacting zone, wherein the first and the second desiccant streams are fed separately into the contactor; and forming a comingled desiccant stream using the first and the second desiccant streams, the comingled desiccant stream exiting from a bottom of the second contacting zone.

For processing the wet comingled desiccant stream, the method may also include the steps of reducing a pressure of the comingled desiccant stream with a pressure reducer; and separating a co-absorbed gas in the comingled desiccant stream from the pressure reducer in a flash separation vessel to form a co-absorbed gas stream and a liquid desiccant stream.

For regenerating the wet comingled desiccant stream, the method may include the steps of flowing the liquid desiccant stream from the flash separation vessel through a stripping column; flowing a first stripping gas stream through the stripping column in a direction counter to the flow of the liquid desiccant stream; boiling the liquid desiccant stream exiting the stripping column in a reboiler; dividing the liquid desiccant stream in the boiler into at least a first regenerated stream and a second regenerated stream; directing the first regenerated stream into a polishing column; feeding a second stripping gas stream into the polishing column in a direction counter to the flow of the first regenerated stream, wherein the second stripping gas stream reduces a water concentration of the first regenerated stream to a level lower than a water concentration of the second regenerated stream; directing the first regenerated stream exiting the polishing column into the first contacting zone, the first regenerated stream being the first desiccant stream; and directing the second regenerated stream exiting the reboiler into the second contacting zone, the second regenerated stream being the second desiccant stream.

The above-recited example of features of the disclosure have been summarized rather broadly in order that the detailed description thereof that follows may be better understood, and in order that the contributions to the art may be appreciated. There are, of course, additional features of the disclosure that will be described hereinafter and which will form the subject of the claims appended hereto.

BRIEF DESCRIPTION OF THE DRAWING

For detailed understanding of the present disclosure, references should be made to the following detailed description of the disclosure, taken in conjunction with the accompanying drawings, in which like elements have been given like numerals and wherein.

DETAILED DESCRIPTION

Figure 1:
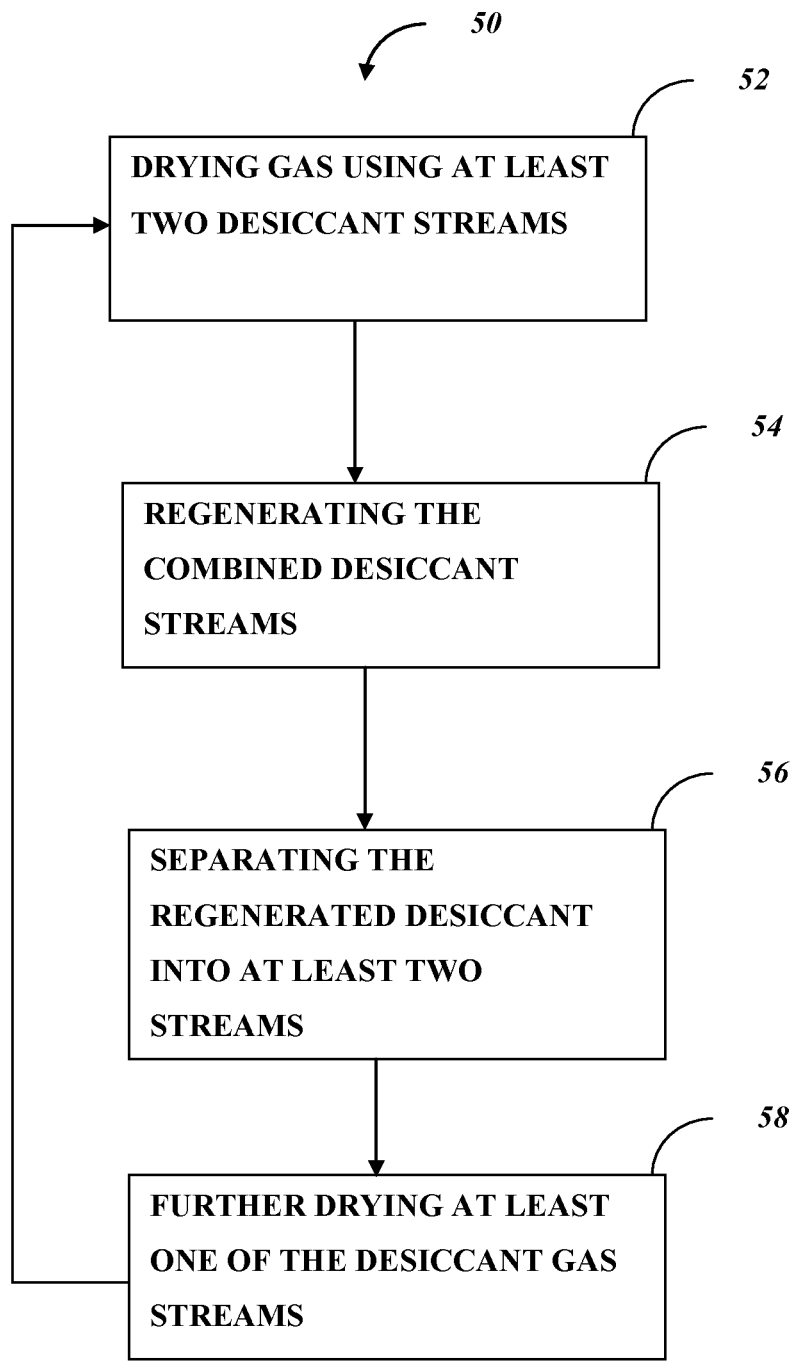
FIG. 1 is a flow chart depicting an illustrative method for dehydrating a gas according to one embodiment of the present disclosure.

The present disclosure provides efficient methods and related systems for drying a gas stream. The present disclosure is susceptible to embodiments of different forms. There are shown in the drawings, and herein will be described in detail, specific embodiments of the present disclosure with the understanding that the present disclosure is to be considered an exemplification of the principles of the present disclosure, and is not intended to limit the disclosure to that illustrated and described herein.

In aspects, the present disclosure provides an improved liquid desiccant dehydration system for the drying of natural gas, or other gas streams, to extremely low water levels while avoiding the complexity and energy load associated with conventional systems. The systems and methods according to the present disclosure accomplish this by using at least two discrete stages to both regenerate the desiccant and to dehydrate the gas. Specifically, the desiccant regeneration produces at least two hygroscopic desiccant streams. Each stream may have a different water content level: e.g., an ultra-dry "polished" stream and a conventionally dry "bulk removal" stream. These discrete desiccant streams dehydrate the gas in separate stages. As should be apparent from the discussion below, implementing the teachings of the present disclosure may lead to a significant reduction in energy and stripping gas requirements for liquid desiccant dehydration systems.

Referring to FIG. 1, there is shown one illustrative method according to the present disclosure. Generally, the method 50 includes a gas drying step 52, a desiccant regenerating step 54, a desiccant separating step 56, and a desiccant polishing step 58. The gas may be any gas wetted with water; e.g., natural gas, refinery gas, carbon dioxide, hydrogen, synthesis gas, gas from an oil production facility and other industrial gases. For brevity, such gases will be referred to as a "product" gas. The desiccant can be any hygroscopic liquid; e.g., triethylene glycol, diethylene glycol and tetraethylene glycol. The steps of the method 50 are described in sequential fashion. However, this is for the clarity of explanation only the steps can be completely joined (i.e., occurring concurrently).

During the gas drying step 52, a product gas is fed into a contactor having at least a first/upper and a second/lower contacting zone. The contactor may be a trayed or packed tower that is provided with two spatially discrete contacting zones. By spatially discrete, it is meant that the zones exclusively occupy different areas within the contactor. The upper zone is used for the ultimate "polishing step" of the gas stream and the lower zone is for the initial "bulk removal" step of the gas stream.

The ultra-dry "polished" stream is fed to the top of the upper contacting zone. The polished stream may represent between about 25% and about 80% of the total flow of desiccant. A less dry desiccant stream, or "bulk removal stream," representing the balance of the total desiccant flow is fed to the bottom of the lower zone.

A fully wet inlet product gas is fed into the bottom of the lower zone. This product gas is first contacted by a comingled desiccant stream that consists of the bulk removal stream and the polished stream exiting the upper zone. This initial contact removes some of the water from the product gas. Upon entering upper zone, the partially dried product gas now contacts the polished stream. This secondary contact removes additional water from the product gas. Thereafter, the fully dried product gas exits the top of the upper zone. The commingled polished stream and bulk removal stream exit the bottom of the lower zone. It should be appreciated that the more valuable highly polished desiccant is spent only on relatively dry gas in the upper zone, while the partially regenerated desiccant is used to contact the wetter inlet product gas in the lower zone.

The regenerating step 54 and the separating step 56 are integrated in many aspects. Regeneration occurs by stripping water out of the wet desiccant stream desiccant by using a regenerator. The regenerator may be a trayed or packed tower that has two or more stripping zones; e.g., an upper zone and a lower zone. The lower zone is used to produce the polished stream and the upper zone is used to produce the bulk removal stream.

In the upper stripping zone, the wet desiccant stream is heated and passed in counter-current flow arrangement with a stripping gas stream flowing from the lower stripping zone. The upper zone may be a reboiler column with a small overhead reflux zone. The bottom of the upper zone is provided with a heat exchanger that heats and boils out some and normally the greater part of the water contained in the wet desiccant stream. Further water removal in the upper zone is accomplished by the stripping gas flowing from the lower stripping zone. Liquid desiccant leaving the bottom of the upper stripping zone is now considered to be partially regenerated.

At this point, the partially regenerated desiccant stream is separated into two streams. A portion of the partially regenerated desiccant stream exiting the regenerator is drawn off. The drawn off partially regenerated desiccant stream is the bulk removal stream that is fed into the lower zone of the contactor as described in connecting with the drying step 52.

The further drying step 58 is performed by feeding the remainder of the partially regenerated desiccant stream liquid into the top of the lower stripping zone. The lower zone is for the final removal of water to a very low level. This may also be referred to as a "polishing zone" or sometimes as a "Stahl Column." The stripping gas entering the polishing zone, which may or may not be preheated, is taken from a gas outlet, overheads of the contactor, or from any other source of compatible dried gas, such as gas leaving a downstream cryogenic process.

The liquid desiccant stream exiting the bottom of the lower zone of the regenerator is the polished stream that is fed into the upper zone of the contactor. The parameters of the bulk removal and the polishing zone (e.g., temperature, flow rate, etc.) can be adjusted as desired to achieve the target dew points in product gas exiting the contactor.

Figure 2:
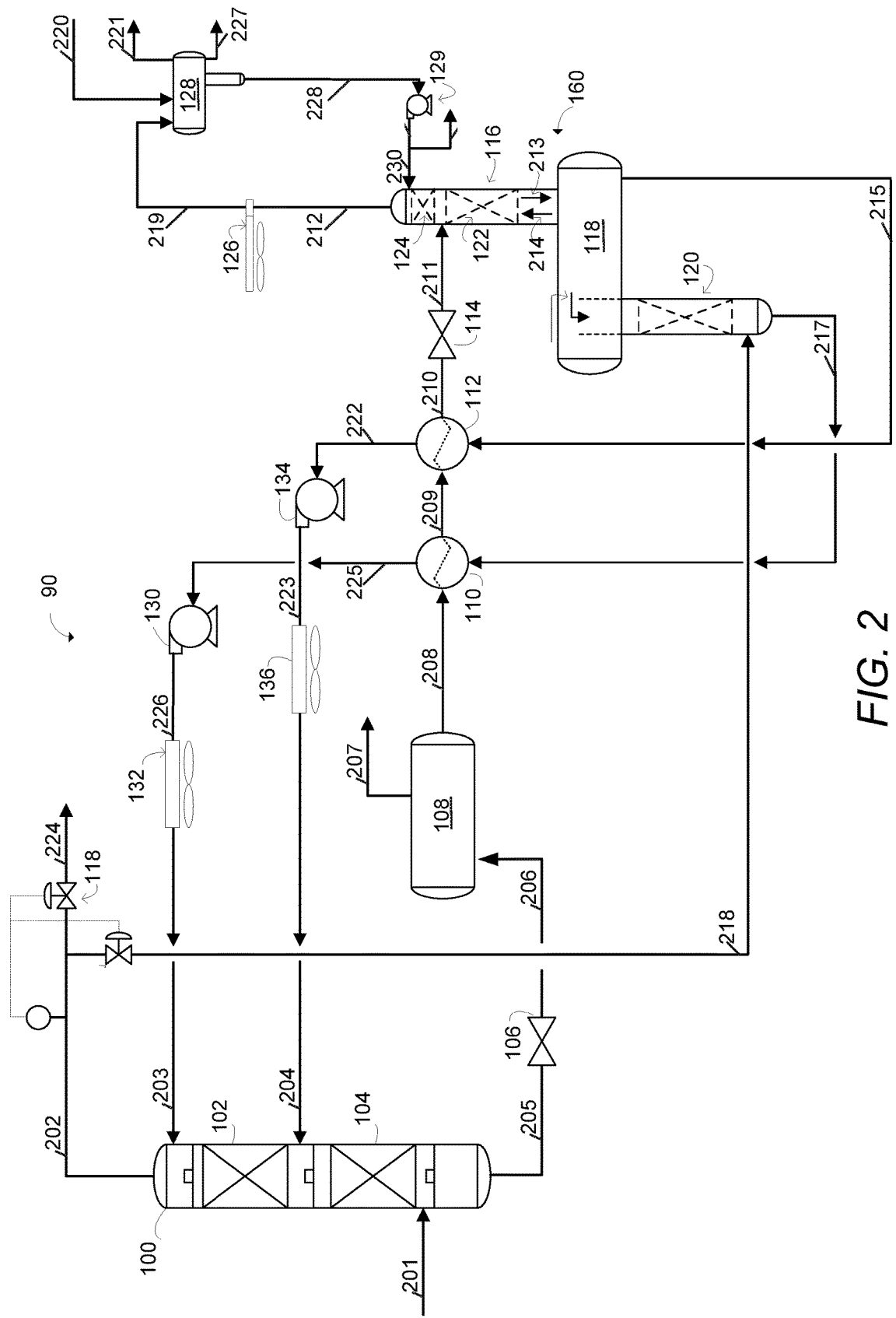
FIG. 2 is an illustrative system for dehydrating a gas in accordance with one embodiment of the present disclosure.

The FIG. 1 liquid desiccation method 50 may be used in any number of system configurations and industrial applications. FIG. 2 illustrates one non-limiting embodiment of a system 90 for regenerating a liquid desiccant according to the present disclosure.

The system 90 includes a contactor 100 for drying a product gas with at least two discrete liquid desiccant streams and a regenerator 160 that supplies the contactor with the discrete liquid desiccant streams. The desiccant streams supplied by the regenerator 160 to the contactor 100 have previously been used to dry the product gas in the contactor 100. That is, the liquid desiccants have been regenerated in the regenerator 160.

The contactor 100 may be a single tower having an upper/polishing zone 102 and a spatially discrete lower/bulk removal zone 104. It should be noted that the polishing zone 102 and the bulk removal zone 104 occupy two separate and distinct volumes in the contactor 100. The upper and lower zones 102, 104 may each be provided with trayed or packed bed(s). Alternatively, the contactor 100 may be constructed as two separate towers linked with the requisite gas and liquid conduits. A product gas is fed into a bottom of the lower zone 104 via a line 201 and the dried product gas exits at the top of the upper zone 102 via line 202. The polished desiccant stream is fed via line 203 into the upper zone 102 and the bulk removal stream is fed via line 204 into the lower zone 104. A wet liquid desiccant stream leaves the contactor 100 via line 205 at the bottom of the lower zone 104.

The upper and lower contacting zones 102 and 104 may be conventional gas-to-liquid contacting columns generally similar to a single gas contactor. The polished desiccant stream entering the top of zone 102 flows downward in counter current contact with the rising product gas stream. The polished desiccant stream, now partially loaded with water, leaves the bottom of the upper zone 102 and comingles with the bulk removal stream delivered by line 204. The exiting polished stream may have some residual hygroscopic capacity even after having absorbed some water in the upper zone 102. The combined stream continues downward through the lower zone 104 while still maintaining a counter current contact with the rising product gas stream.

A dried product gas exits the top of the upper zone 102. The liquid desiccant exiting the bottom of the lower zone 104 is now "wet" from the water removed from the product gas. The wet liquid desiccant may now be conveyed to the regenerator 160. Before being fed into the regenerator 160, the wet liquid desiccant may optionally undergo one or more processing steps. An illustrative, but non-limiting, processing sequence is described below.

The wet desiccant stream leaving the contactor 100 via line 205 may initially be "flashed" to a pressure lower than the contacting pressure in the contactor 100. For example, the wet liquid desiccant may flow through a pressure reducer 106 that drops the pressure to a level sufficient to release a major portion of the absorbed light hydrocarbons in this stream. The pressure reducer 106 may be any device that generates a desired pressure drop in a fluid stream; e.g., a valve, a hydraulic turbine, etc. Typically, a pressure of between about 20 psig and about 100 psig is used as the discharge pressure of the valve 106. This initial "flash separation" is conventional in the drying of high pressure natural gas streams but may not be needed when significant co-adsorption is not occurring or when capital costs prohibit. The operating pressure of this flash separation may be above the operating pressure of the regenerator 160.

The flashed liquid desiccant stream is delivered by line 206 from the valve 106 to a flash tank 108. In the flash tank 108, a dissolved, co-absorbed gas separates from the liquid desiccant and leaves the system 100 via line 207. The separated gas may be used for fuel, used as an additional source of stripping gas, or returned to the main gas stream by some means of compression. Liquid desiccant leaving the flash tank 108 is typically, though not necessarily, heated in a heat exchanger with the hot regenerated desiccant streams as an energy saving measure. As this disclosure presupposes two or more discrete desiccant streams, this heat exchange may be practiced in two or more series or parallel exchangers, or in a single combined exchanger to maximize heat recovery.

The liquid desiccant leaves the flash tank 108 via line 208, which feeds one or more heat exchangers, 110 and 112. The heat exchangers 110, 112 are shown in series arrangement but may also be arranged in parallel or combined. The heat exchangers 110, 112 recover heat from the hot regenerated desiccant streams that are conducted through lines 215 and 217, thereby raising the temperature of the wet desiccant stream in line 208 to a higher temperature in line 210. The heat exchange also reduces the heat load in the regenerator 160.

It should be noted that heat exchangers 110, 112 might as easily be placed in line 206 and upstream of the flash tank 108 without substantially changing the purpose or functionality of this embodiment. Similarly, instead of two heat exchangers 110, 112 connected by a line 209, the heat exchangers could be combined into a single heat exchanger. Moreover, one or both of the heat exchangers 110, 112 can be eliminated without departing from the teachings of this disclosure.

Line 210 conveys the heated desiccant to the regenerator 160 via a regenerator feed valve 114. The regenerator 160 may include a first stripping tower 116, a reboiler 118, and a second stripping tower 120. The first stripping tower 116 may include a stripping zone 122 and a reflux zone 124. As discussed below, the regenerator 160 dries the heated desiccant and supplies the contactor 100 with the polished desiccant stream and the bulk removal stream.

In the illustrated embodiment, the heated desiccant flows from the regenerator feed valve 114 and into a top of the stripping zone 122 via line 211. The hot desiccant flows downward in counter current flow through the first stripping tower 116 against a stripping gas stream, shown with arrow 214, rising from the reboiler 118. The partially stripped desiccant stream, shown with arrow 213, leaves the bottom of zone 122 and enters the reboiler 118. The reboiler 118 heats the partially stripped desiccant stream and thereby increases the relative volatility of the water, which allows the water to boil out of the desiccant.

A portion of desiccant is drawn via line 215 from the reboiler 118 to act as the bulk removal stream. The amount of desiccant drawn as the bulk removal stream can be between about 30% and 80% of the total liquid desiccant volume.

The balance of desiccant in the reboiler 118 flows into the top of the second stripping tower 120. The second stripping tower 120 further strips exiguous quantities of moisture in a polishing step. The desiccant stream entering the second stripping tower 120 flows in counter current fashion against a rising dry stripping gas stream. The rising dry stripping gas stream enters at the bottom of the stripping tower 120 via line 218. Line 218 may receive a portion of the dried product gas in line 202. The ultra-dry, "polished" desiccant stream leaves the bottom of the stripping tower 120 via line 217.

As previously described, the hot polished desiccant stream is cooled in the heat exchanger 110. After leaving the heat exchanger 110 via line 225, the partially cooled polished desiccant is pumped by a pump 130 to a pressure sufficiently high to permit it to enter the contactor 100. The discharge line 226 of the pump 130 feeds the partially cooled desiccant to a heat exchanger 132. The heat exchanger 132, shown as an air cooler, further cools the partially cooled desiccant to as close to ambient temperature as is practical, but typically within 10 to 20 degrees F. The cooled, polished desiccant is then fed into the top of the upper zone 102 via line 203 as previously described.

The partially regenerated desiccant, or bulk removal stream, leaves the reboiler 118 via line 215. As previously described, the bulk removal stream is cooled in heat exchanger 112. After leaving the heat exchanger 112 via line 222, the bulk removal stream is then pumped by pump 134 to a pressure sufficiently high to permit it to enter the contactor 100. The discharge line 223 of the pump 134 feeds the partially bulk removal stream to a heat exchanger 136. The heat exchanger 136, shown as an air cooler, further cools the partially bulk removal stream to as close to ambient temperature as is practical, but typically within 10 degrees F. The cooled, bulk removal stream is then fed into the top of the lower zone 104 via line 204 as previously described.

The above embodiments have been described as using two streams having distinctly different water contents and embodiments wherein the two streams are generated using two distinct regenerating stages. It should be understood, however, that other embodiments of the present disclosure may use three or more distinctly different liquid desiccant streams and three or more distinct regenerating stages to obtain these different liquid desiccant streams.

For the sake of completeness, the remainder of the system 100 is described below. However, it should be understood that the further features and processes described below in no way limit the teachings of the present disclosure.

The reflux zone 124 returns any vaporized desiccant to the reboiler 118 rather than allowing it to be lost to the overhead system. The vaporized desiccant is refluxed with a small quantity of water delivered via line 220 which comes from an overhead scrubber (not shown). The reflux can also be generated by an internal reflux coil (not shown) located in the top of the first stripping tower 116 or by conduction fins (not shown) mounted on the outside of the top of the first stripping tower 116.

The overhead vapors leave reflux zone 124 via line 212 and are directed to the overhead condenser 126. The overhead condenser 126 may be a heat exchanger where the vapors are cooled and partially condensed. The condenser may be an air cooled exchanger as shown or any other convenient cooling medium. The cooled and partially condensed stripping gas is then sent via line 219 to an overhead separator 128, which may be a three phase separator. The overhead separator 128 generates a separated vapor that flows out of line 221, a condensed hydrocarbons stream that flows out of line 227, and a condensed water stream that flows out of line 228. A small portion of the water stream in line 228 is pumped with a pump 129 back to the top of the reflux zone 124 via line 230 as a reflux to the first stripping tower 116. The remaining water is sent via line 31 to a water disposal system or otherwise recovered.

In view of the above, those skilled in the art will appreciate that the teachings of the present disclosure are directed to drying a product gas stream to very low levels of water in an economical fashion. Applications of the present teachings may be found in the processing of natural gas or refinery gas. Such applications often require a system to recover the used, wet stripping gas rather than to simply vent it to atmosphere.

With dehydration systems which use glycol based hydroscopic desiccants for natural gas dehydration, an inevitable result is that certain valuable but polluting hydrocarbons are absorbed and will be vented to the atmosphere along with the coabsorbed water. These are typically so called "BETX" hydrocarbons, (Benzene, Ethyl Benzene, Toluene and Xylene), as well as methane, ethane and heavier aliphatic hydrocarbons. Environmental regulations typically require that these pollutants be captured and most modern designs address this requirement. Systems which reduce the total flow of desiccant, and/or which reduce the total flow of stripping gas simplify and minimize the capital and energy cost of hydrocarbon emissions.

Figure 3:
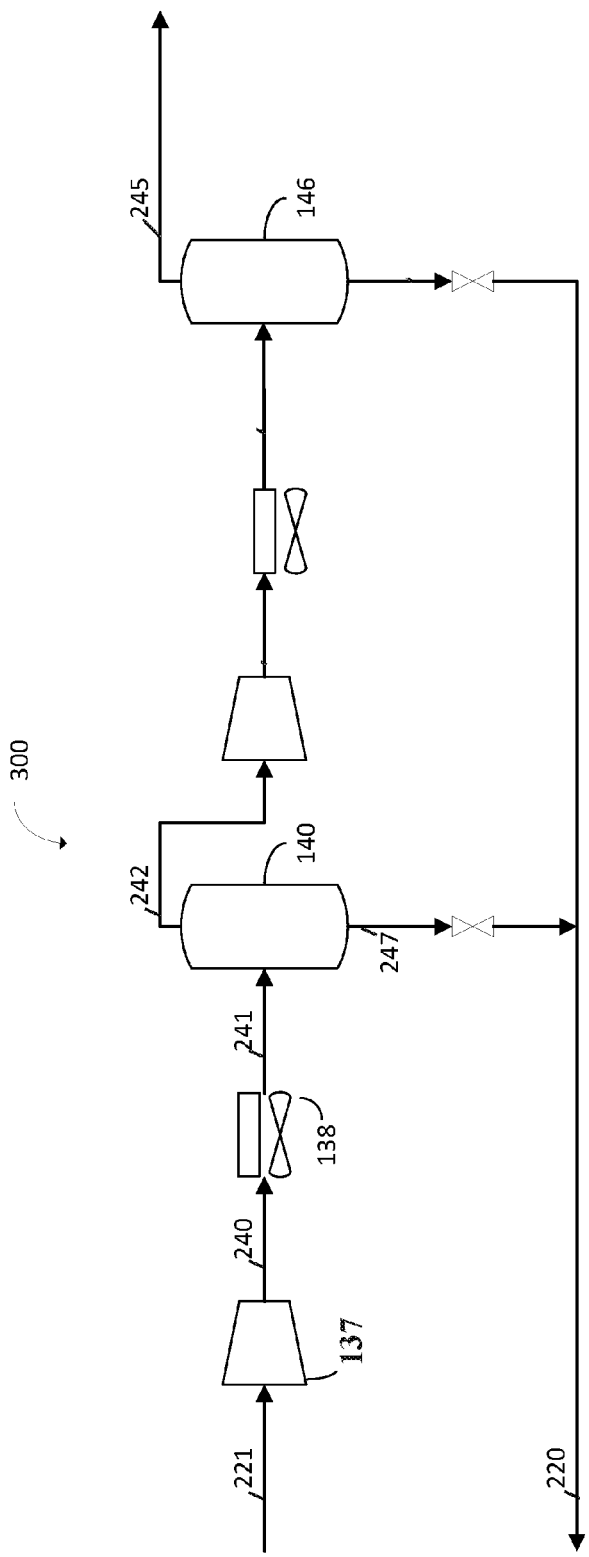
FIG. 3 is an illustrative stripping gas recovery system that may be used with the methods and systems according to the present disclosure.

Referring now to FIG. 3, there is shown a stripping gas recovery/recycle system 300. For instance, energy and capital benefits may be realized in that relatively high recovery of valuable BTEX liquids may be obtained without a substantial increase in capital or energy costs. In a conventional manner, the system 300 may include two or more stages, each of which includes a compressors 137, 142, heat exchanger 138, 144, and separators 140, 146.

In practicing the disclosure, the used stripping gas leaving the overheads of the upper stripping zone of the regenerator will be cooled in order to condense the greater part of the contained water and hydrocarbons. These liquids will then be separated in an overhead reflux drum. There will be two liquid phases formed in the condensate, a lighter liquid phase consisting primarily of hydrocarbons and a heavier liquid phase consisting primarily of water. The water phase will be delivered outside of the battery limits for disposal with a small amount pumped back to the top of the stripping tower as a liquid reflux. The lighter hydrocarbon phase shall be decanted from the separator and collected as valuable liquid hydrocarbon distillate. The vapor from the separator will then be compressed and further cooled in one or more stages of compression. After compressing and cooling this gas stream further liquids will be condensed which may be recovered and collected in a manner identical to the liquids condensed upstream of the compression system. Finally a pressure will be reached which allows the stripping gas stream to be returned to the main gas stream thereby completing the stripping gas circuit. The practice of this disclosure permits the entire stripping gas system with its attendant gas recycle compression system and liquid recovery system to be reduced in size since the stripping gas flow rate itself has been reduced in quantity.

The separated and cooled stripping gas leaving the separator 128 (FIG. 2) via line 221 is compressed in a first stage of compression by compressor 136. The compressed vapor stream leaves the compressor 136 via line 240 and is delivered to the heat exchanger 138. The heat exchanger cools the compressed vapor stream to approximately ambient temperature, which causes additional water and hydrocarbon vapors to condense. The condensed fluids are delivered to the separator 140 via line 241. The separator 140 separates the gaseous components of the received condensed stream and delivers the gaseous components via line 242 to the second stage. The separated liquid components are delivered via line 247. The separator 140 is primarily provided to avoid the admittance of liquids into the inlet of the next sequential compressor as liquids are generally damaging to this equipment.

The cooled stripping gas leaving the separator 140 via line 242 is compressed, cooled and separated in a similar fashion using the compressor 142, the heat exchanger 144, and the separator 126. This process may be repeated as needed to reach the final desired pressure needed to permit the stripping gas to reenter the system elsewhere at high pressure. The liquid streams leaving the interstage separators 140, 146 may be returned to the lowest pressure separator 128, where the water phases and hydrocarbon liquid phases may be separated from each other and recovered.

From the above, it should also be appreciated that one aspect of the disclosure is the high level regeneration of only a portion of the liquid desiccant thereby reducing the flow requirement of the stripping gas while achieving identical water levels in said stream. The balance of the "used" wet desiccant is only regenerated to normal levels. An advantage of this aspect is that the reduced stripping gas flow rate which is normally compressed and returned to the inlet gas stream requires a far smaller compressor with the attendant advantages of reduced capital and energy costs.

From the above, it should be appreciated that another aspect of the disclosure is the two stage contact of the gas stream to be dehydrated. Conventional dehydration contacting system dry desiccant flows to the top of the contacting tower and the wet gas flows to the bottom of the contacting tower where the two streams flow in conventional stage-wise counter current flow. By dividing the desiccant into two or more streams, the systems and methods according to the present disclosure make a more efficient contact arrangement possible by feeding the very low water content, the polished stream, to the top of the contactor and the higher water content feed to a lower feed point on the contactor.

From the above, it should be appreciated that yet another aspect of the disclosure is that the total flow of desiccant required to achieve given low level moisture in the product gas is less with the split flow design than with the conventional single stream design. This may have several favorable follow-on effects in fuel consumption, pollution reduction and capital cost. Significantly, lower circulation rates of desiccant reduce the amount of co-adsorbed aromatic hydrocarbons.

The drawings and description here do not show the filters, storage tanks, instrumentation and other ancillary equipment that would normally and necessarily be included in such a system in order to make the pertinent aspects of the disclosure more clearly illustrated.

The foregoing description is directed to particular embodiments of the present disclosure for the purpose of illustration and explanation. It will be apparent, however, to one skilled in the art that many modifications and changes to the embodiment set forth above are possible without departing from the scope of the disclosure. Thus, it is intended that the following claims be interpreted to embrace all such modifications and changes.

What is claimed is:

1. A method of reducing a water content of a gas stream by using a contactor having at least a first contacting zone and a spatially distinct second contacting zone, the method comprising:
    feeding a first desiccant stream into the first contacting zone;
    feeding a second desiccant stream into the second contacting zone, wherein the first and the second desiccant streams are fed using separate lines into the contactor;
    forming a comingled desiccant stream using the first and the second desiccant streams, the comingled desiccant stream exiting from a bottom of the second contacting zone;

directing the gas stream through the second contacting zone and then through the first contacting zone, the gas stream first contacting the comingled desiccant stream and then only the first desiccant stream;

reducing a pressure of the comingled desiccant stream with a pressure reducer;

separating a co-absorbed gas in the comingled desiccant stream from the pressure reducer in a flash separation vessel to form a co-absorbed gas stream and a liquid desiccant stream;

flowing the liquid desiccant stream from the flash separation vessel through a stripping column;

flowing a first stripping gas stream through the stripping column in a direction counter to the flow of the liquid desiccant stream;

boiling the liquid desiccant stream exiting the stripping column in a reboiler;

dividing the liquid desiccant stream in the reboiler into at least a first regenerated stream and a second regenerated stream;

directing the first regenerated stream into a polishing column;

feeding a second stripping gas stream into the polishing column in a direction counter to the flow of the first regenerated stream, wherein the second stripping gas stream reduces a water concentration of the first regenerated stream to a level lower than a water concentration of the second regenerated stream;

cooling the first regenerated stream exiting the polishing column and directing the first regenerated stream into the first contacting zone, the first regenerated stream being the first desiccant stream; and cooling the second regenerated stream exiting the reboiler and directing the second regenerated stream into the second contacting zone, the second regenerated stream being the second desiccant stream.

2. The method of claim 1, further comprising using at least a portion of the co-absorbed gas stream as one of: (i) an additional stripping gas stream, and (ii) an alternate stripping gas stream.

3. The method of claim 1, wherein an amount of the first desiccant stream is in the range of 20% to 80% of the amount of the total liquid desiccant in the reboiler.

4. The method of claim 1, wherein the first desiccant stream and the second desiccant stream include at least a glycol.

5. The method of claim 1, further comprising heating the comingled desiccant stream exiting the second contacting zone in at least one heat exchanger.

6. The method of claim 5, wherein the comingled desiccant stream is heated before entering the flash separation vessel.

7. The method of claim 5, wherein the comingled desiccant stream is heated after exiting the flash separation vessel.

8. The method of claim 5, wherein the at least one heat exchanger comprises one of: (i) at least two heat exchangers arranged in series, and (ii) at least two heat exchangers arranged in parallel.

9. The method of claim 5, wherein a heating fluid in the at least one heat exchanger is at least one of: (i) the first regenerated stream exiting the polishing column; (ii) and the second regenerated stream exiting the reboiler.

* * * * *